United States Patent [19]

Lind et al.

[11] Patent Number: 5,419,799
[45] Date of Patent: May 30, 1995

[54] AIR-EXHAUSTING AND PRE-PRESSING APPARATUS FOR LAMINATED GLASS SHEETS

[75] Inventors: Kalevi Lind; Mauri Leponen, both of Tampere, Finland

[73] Assignee: Tamglass Engineering Oy, Tampere, Finland

[21] Appl. No.: 157,059
[22] PCT Filed: May 26, 1992
[86] PCT No.: PCT/FI92/00104
§ 371 Date: Dec. 2, 1993
§ 102(e) Date: Dec. 2, 1993
[87] PCT Pub. No.: WO92/22427
PCT Pub. Date: Dec. 23, 1992

[30] Foreign Application Priority Data

Jun. 11, 1991 [FI] Finland ................... 912796

[51] Int. Cl.[6] ................ B32B 31/20; B32B 31/26
[52] U.S. Cl. ........................ 156/381; 156/382; 156/104; 156/286; 156/497; 156/498; 156/499; 156/539; 34/212; 219/388
[58] Field of Search .............. 156/104, 286, 381, 382, 156/538, 539, 497, 498, 499; 34/209, 210, 211, 212, 213, 216, 217; 219/388

[56] References Cited

U.S. PATENT DOCUMENTS

| 2,052,545 | 9/1936 | Bishop et al. | 219/388 X |
| 2,994,629 | 8/1961 | Richardson | 156/104 |
| 3,281,296 | 10/1966 | Jameson | 156/104 |
| 3,347,723 | 10/1967 | Hill | 156/104 X |
| 3,574,586 | 4/1971 | Johnson | 65/152 |
| 3,852,136 | 12/1974 | Plumat et al. | 156/103 |
| 3,971,668 | 7/1976 | Pickard et al. | 156/104 |
| 4,601,772 | 7/1986 | McKelvey | 156/382 |
| 4,865,671 | 9/1989 | Bishop et al. | 156/104 |

Primary Examiner—Michael W. Ball
Assistant Examiner—Francis J. Lorin
Attorney, Agent, or Firm—Burns, Doane, Swecker & Mathis

[57] ABSTRACT

The invention relates to an air-exhausting and pre-pressing apparatus for laminated glass sheets. In the manufacture of laminated windscreens, the glass sheets are carried on a conveyor in a substantially upright position through a heating tunnel. The suction tubes included in a suction track adjacent to the conveyor are coupled with suction rings surrounding the edges of the laminated glass sheets. A preheating station, a heating station, and a recooling station are set successively to define together a heating tunnel, the conveyor extending through the heating tunnel. The preheating station and the recooling station are linked with each other by at least two air circulation ducts for circulating air from the recooling station to the preheating station and from the preheating station back to the recooling station. The arrangement saves heating energy and achieves a uniform heating and cooling of glass sheets.

4 Claims, 4 Drawing Sheets

AIR-EXHAUSTING AND PRE-PRESSING APPARATUS FOR LAMINATED GLASS SHEETS

BACKGROUND AND SUMMARY

The present invention relates to an air-exhausting and pre-pressing apparatus for laminated glass sheets. The apparatus includes a conveyor, fitted with means for supporting laminated glass sheets in a substantially upright position on the conveyor. The apparatus further includes a pre-heating station, a heating station and a recooling station set successively to define together a heating tunnel for carrying said conveyor therethrough. The apparatus also includes a suction track, mounted adjacent to the conveyor and also extending through the heating tunnel and provided with suction tubes that can be coupled with suction rings surrounding the edges of laminated glass sheets. The apparatus also includes air circulation ducts, included in the heating station and having their ends fitted with blasting and suction ports on opposite sides of the heating tunnel for blasting the heating air between glass sheets, as well as fans and heating elements associated with the air circulation ducts.

This type of equipment is generally used in the manufacture of laminated windscreens. Heating is used to provide a preliminary adhesion between glass sheets to be laminated and a plastic film therebetween while suction is applied to exhaust the air from between glass sheets. Heating mechanisms for glass laminates have been described e.g. in German publications DE 2 209 642, DE 2 050 033 and DE 2 241 754. A drawback in these prior known mechanisms is high energy consumption in relation to production capacity.

An object of the invention is to provide an improved apparatus capable of substantially saving heating energy while increasing production capacity and performing the heating and cooling of a glass sheet effectively and uniformly.

This object is achieved on the basis of the characterizing features set forth in the annexed claim 1.

BRIEF DESCRIPTION OF THE DRAWINGS

The invention will now be described in more detail with reference made to the accompanying drawings, in which.

Figure 1:
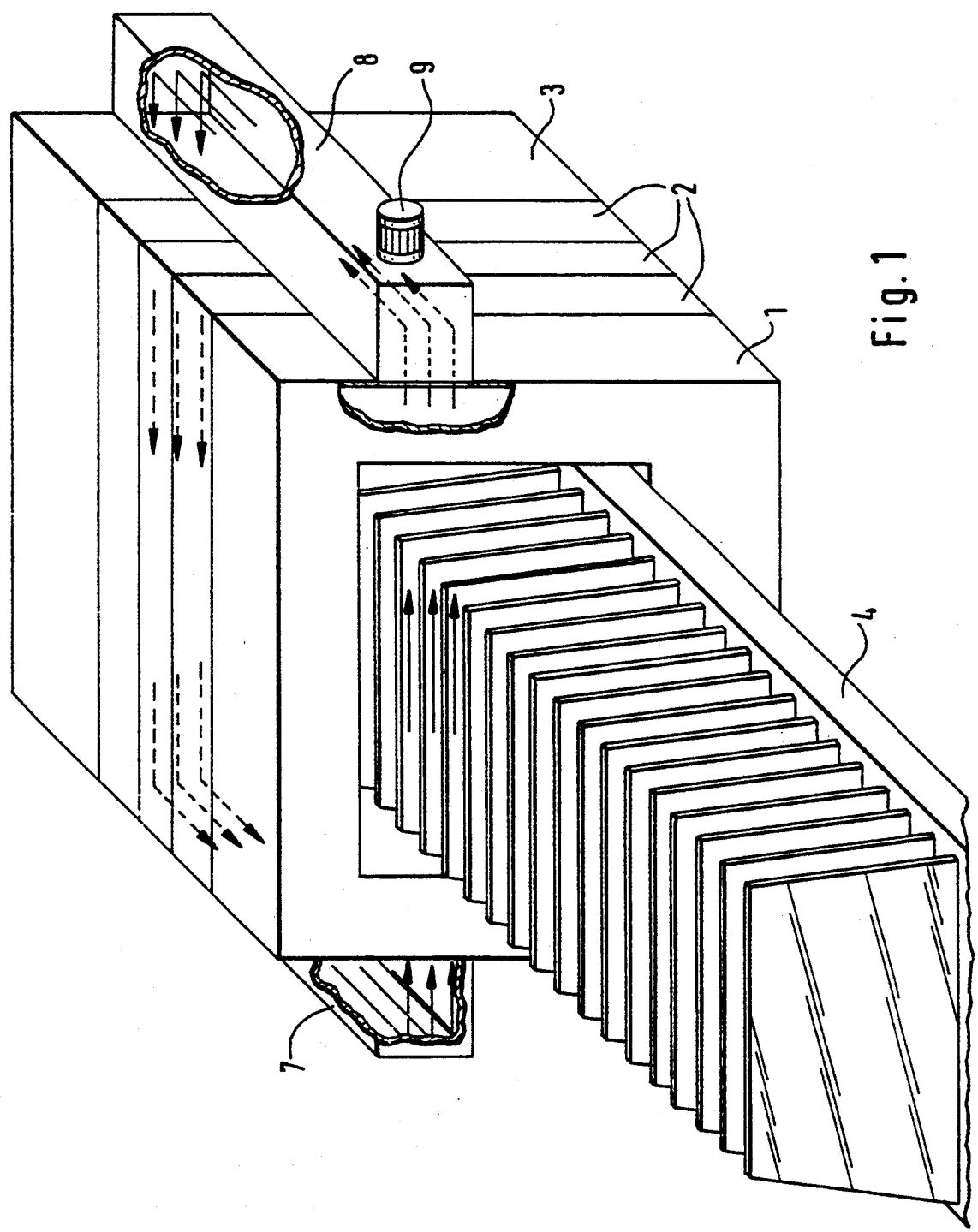
FIG. 1 shows an apparatus of the invention in a schematic perspective view.
Figure 2:
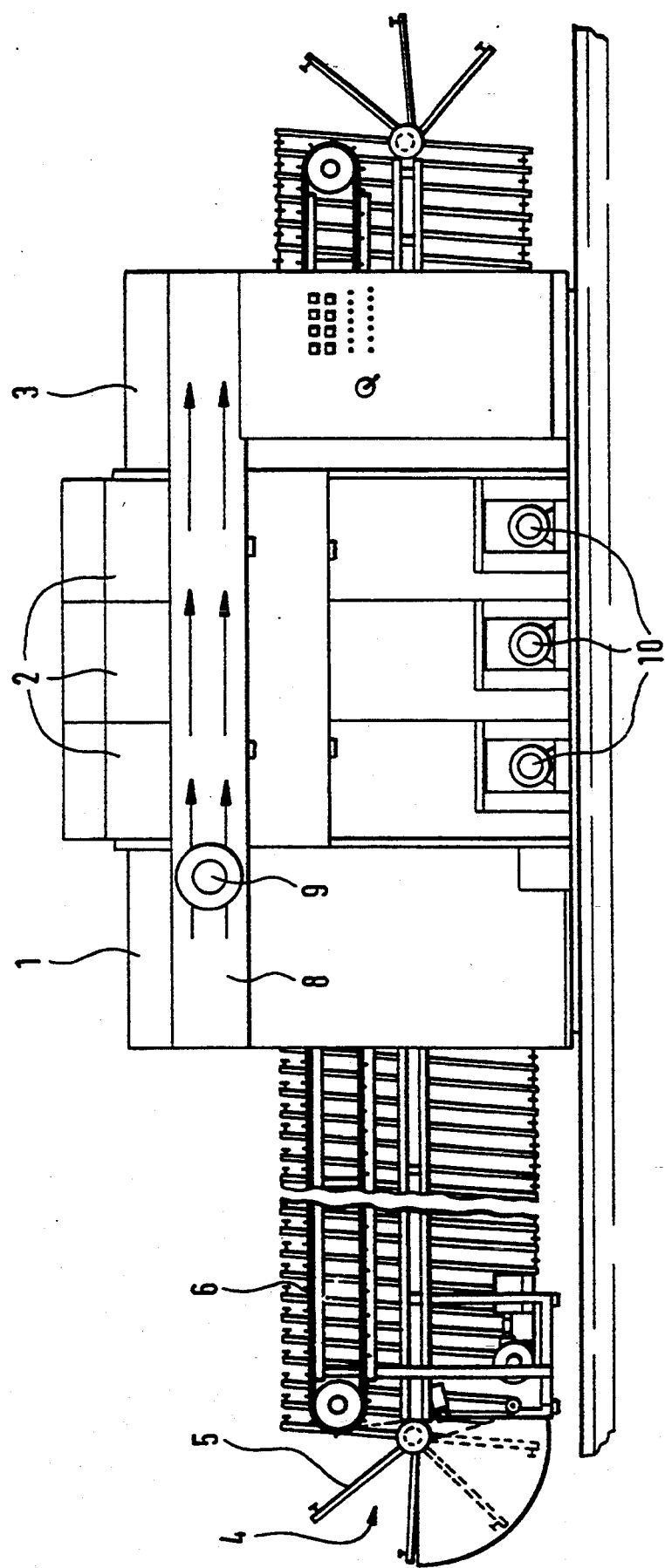
FIG. 2 shows an apparatus of the invention in a side view.
Figure 3:
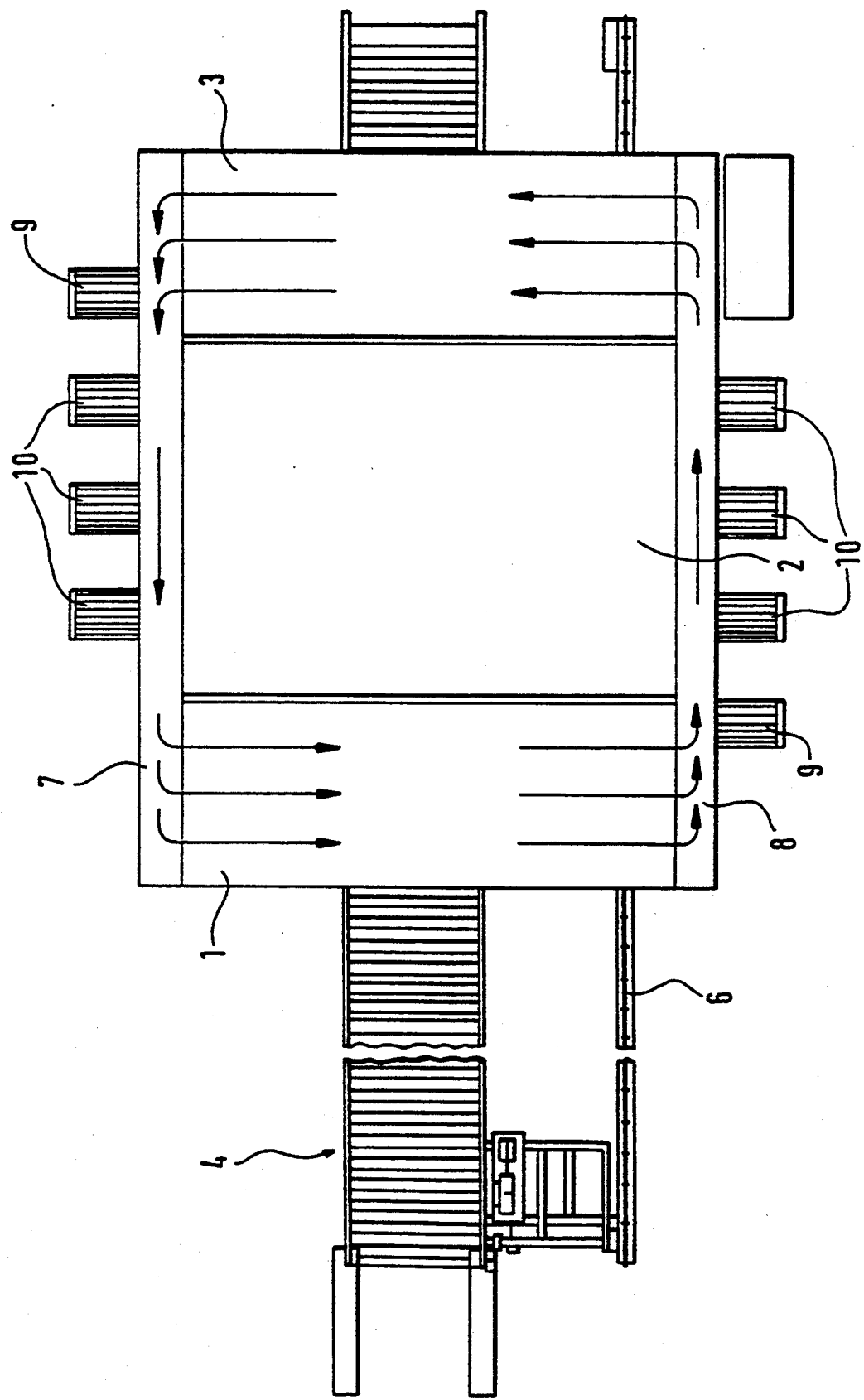
FIG. 3 shows the apparatus of FIG. 2 in a plan view.

The Detailed Description apparatus shown in FIGS. 1-3 includes a preheating station 1, three heating stations 2 and a recooling station 3 set successively to define together a heating tunnel, through which the pairs of glass sheets to be laminated are carried in a substantially upright position by means of a conveyor 4. Conveyor 4 is provided with holding arms 5 for supporting the pairs of glass sheets in an upright position.

Figure 5:
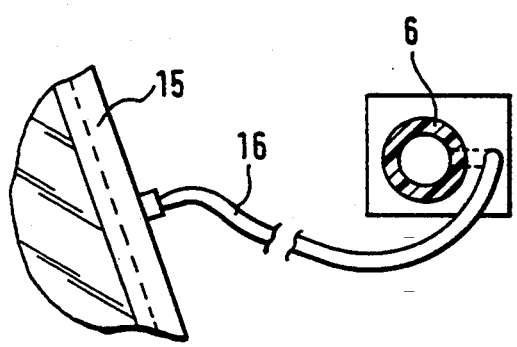
FIG. 5 depicts the coupling of a suction track with a suction ring at the edge of a glass sheet.

Adjacent to conveyor 4 is a suction track 6, which is also extended through the heating tunnel and whose suction tubes 16 (FIG. 5) can be coupled with suction rings 15 surrounding the edges of laminated glass sheets.

Figure 4:
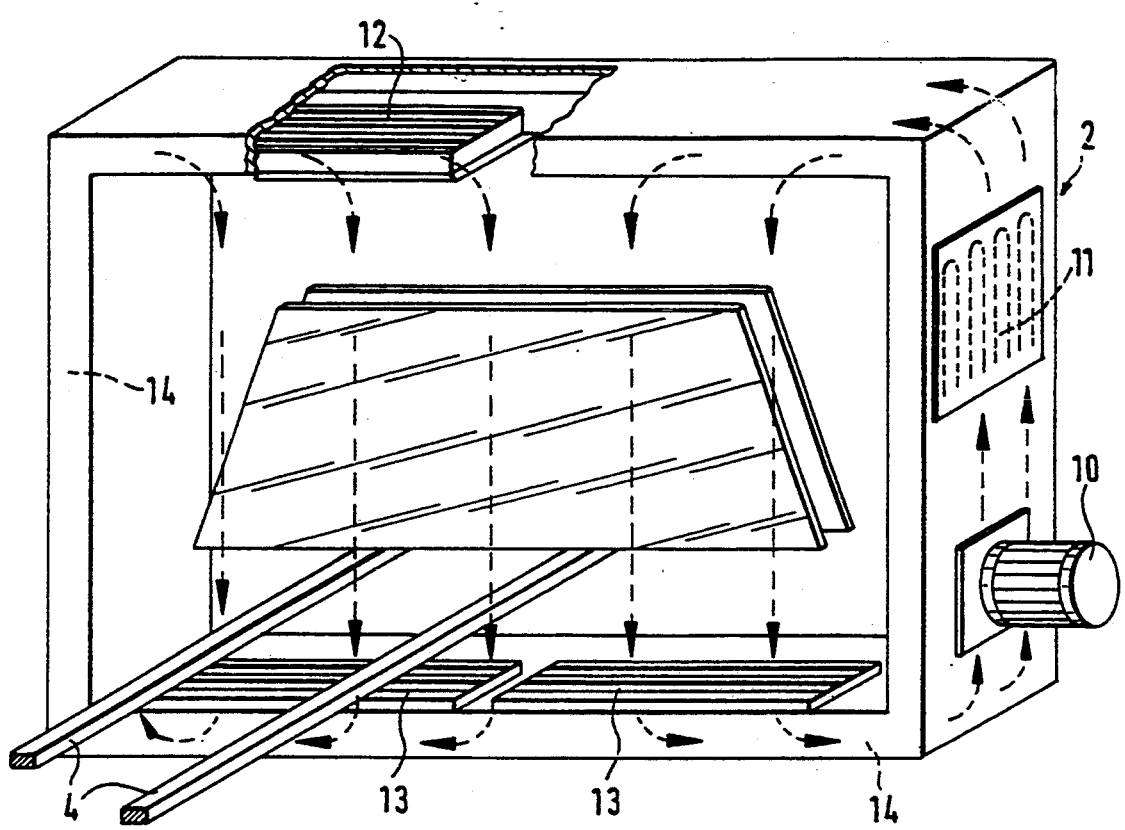
FIG. 4 is a schematic perspective view of a heating station included in the apparatus, illustrating the currents of heating air in an individual heating station.

FIG. 4 shows in more detail an individual heating station 2. It includes air circulation ducts 14 which terminate in blasting ports or slots 12 on the ceiling of station 2 and in suction slots 13 on the floor. Thus, said blasting and suction slots 12, 13 are located on opposite sides of the heating tunnel for blasting the heating air through between glass sheets in vertical direction from top to bottom. For the circulation of heating air said duct 14 is fitted with a fan 10. In addition, duct 14 is provided downstream of fan 10 with electric resistance heating elements 11 for heating the air typically to a temperature of 140° C. The temperature of pairs of glass sheets to be laminated in heating station 2 is typically raised to the range of 90°–100° C.

Preheating station 1 and recooling station 3 are linked with each other by at least two air circulation ducts 7 and 8, which by-pass heating stations 2 and whose blasting and suction slots are located in stations 1 and 3 on opposite sides of the heating tunnel. Ducts 7 and 8 are fitted with fans 9 for effecting the circulation of air from recooling station 3 to preheating station 1 and from preheating station 1 back to recooling station 3. Thus, the circulation air travels in both stations 1 and 3 in horizontal direction between the glass sheets. Thus, the heat energy delivered by glass sheets upon cooling can be used for preheating the glass sheets in station 1. Preheating is typically effected from an initial temperature of 25° C. to a temperature of 34° C. The temperature of preheating air blasted from duct 7 is e.g. appr. 62° C. By virtue of preheating, the output of heating elements 11 in heating stations 2 can be reduced e.g. from 151 kW to 132 kW for an energy saving of appr. 13%. In addition to energy savings, another advantage gained is a more uniform heating and more rapid cooling.

The external sides of stations 1, 2 and 3 are provided with sufficient room for ducts 7 and 8. Ducts 7 and 8 as well as ducts 14 in individual heating stations 2 can be dimensioned in a manner that the volume flow rate of air is in the order of 2 $m^3/s$, the flow area in the order of 0.7 $m^2$, resulting in a flow rate in the order of 3.1 m/s. Thus, in all stations 1, 2 and 3 is achieved an effective heat transfer between flowing air and glass sheets.

While this invention has been illustrated and described in accordance with a preferred embodiment, it is recognized that variations and changes may be made therein without departing from the invention as set forth in the claims.

We claim:

1. An air-exhausting and pre-pressing apparatus for laminated glass sheets, comprising a conveyor, the conveyor being fitted with means for supporting laminated glass sheets in a substantially upright position on the conveyor;

a preheating station, a heating station and a recooling station set successively to define together a heating tunnel for carrying the conveyor therethrough;

a suction track, the suction track being mounted adjacent to the conveyor and extending through the heating tunnel, the suction track being provided with suction tubes for coupling with suction rings surrounding edges of the laminated glass sheets;

air circulation ducts, the air circulation ducts being included in the heating station, the air circulation ducts having ends fitted with blasting and suction slots on opposite sides of the heating tunnel for blasting heated air between the laminated glass sheets;

fans and heating elements associated with the air circulation ducts, for providing air flow through the ducts and for heating the air in the ducts, respectively; and at least one pair of air circulation ducts which by-pass the heating staion, the at least one pair of air circulation ducts linking the preheating station and the recooling station, the at least one pair of air circulation ducts including blasting and suction slots located in the preheating station and the recooling station on opposite sides of the heating tunnel, the at least one pair of air circulation ducts being fitted with fans for circulating air from the recooling station to the preheating station and from the preheating station back to the recooling station, circulating air travelling in both the preheating and the recooling stations between the laminated glass sheets.

2. An apparatus as set forth in claim 1, wherein the at least one pair of air circulation ducts between the preheating and recooling stations is located on external sides of the preheating and recooling stations and the blasting and suction slots of the at least one pair of air circulation ducts are located on internal sides of the preheating and recooling stations such that air currents in the preheating station and the recooling station, respectively, proceed in substantially horizontal directions and in opposite directions relative to each other.

3. An apparatus as set forth in claim 1, wherein the blasting and suction slots of the heating station are located on a ceiling and a floor of the heating station, respectively, such that the air flow in the heating tunnel proceeds in a substantially vertical direction.

4. An apparatus as set forth in claim 2, wherein the blasting and suction slots of the heating station are located on a ceiling and a floor of the heating station, respectively, such that the air flow in the heating tunnel proceeds in a substantially vertical direction.

* * * * *